Figure 1:
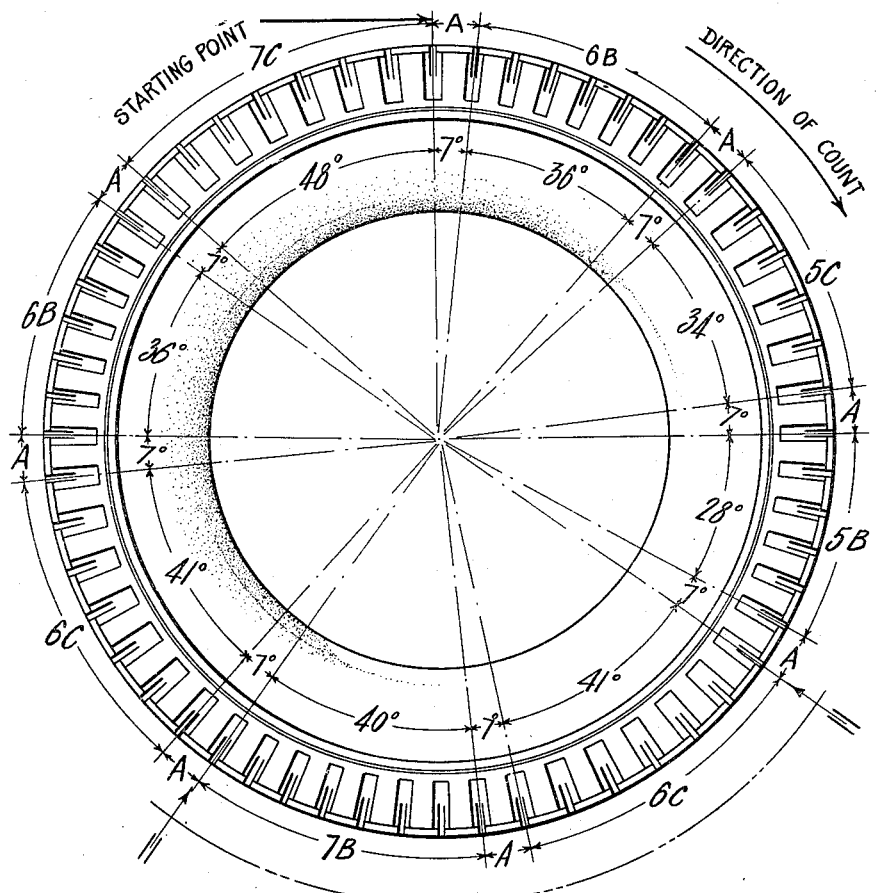

June 25, 1935.  E. S. EWART ET AL  2,006,197

PNEUMATIC TIRE

Filed Oct. 5, 1934

INVENTORS
ELLIOTT S. EWART
ARTHUR W. BULL
BY
ATTORNEY

Patented June 25, 1935

2,006,197

UNITED STATES PATENT OFFICE 2,006,197

PNEUMATIC TIRE

Elliott S. Ewart, St. Clair Shores, and Arthur W. Bull, Grosse Pointe, Mich., assignors to United States Rubber Company, New York, N. Y., a corporation of New Jersey Application October 5, 1934, Serial No. 746,996

8 Claims. (Cl. 152—14)

Our invention relates to pneumatic tires, and more particularly to an arrangement of tread elements thereon for the purpose of reducing noises produced by such tires when in use. Broadly, the invention provides an arrangement of traction elements or blocks on tire treads in such a manner that no successive similar groups of elements or blocks recur around the circumference of the tire.

The noises produced by vehicle tires, particularly pneumatic tires, when in engagement with a roadway are well known. Such noises originate with the traction elements of the tread upon impact with the road surface. Such impacts set up definite noises which in pitch and degree are relatively dependent upon the length and/or size of the traction elements, and the speed of rotation of the tire. An increase of the speed of rotation of the tire produces a higher pitch.

A tire having a plain or rib tread is the most desirable so far as the noise characteristics are concerned as it produces a noise which is low in degree and without pitch. However, it is practically necessary to provide tire treads with anti-skid elements. When the anti-skid configuration is broken up into a number of circumferentially spaced traction units the pitch noises produced depend upon the proportioning and the grouping of the traction elements. The more nearly continuous ribs are approached, as by providing long traction elements, the lower the noise in pitch, and conversely, the shorter traction elements produce a pitch of higher frequency.

In general practice, a tread configuration comprises a plurality of uniformly proportioned traction elements spaced at regular distances circumferentially of the tire. Upon engagement with the ground these configurations produce a sound of definite pitch. In an effort to avoid the uniformly proportioned traction elements, it has been proposed to separate them and interpose traction elements of different proportions to form a contiguous row of traction elements having a proportionate sequence in the order of A—B, etc. A tire tread having traction elements in such a sequence produces sounds in which two or more tones are blended. In such a case, however, the frequency of the recurring noise groups is so rapid that the total sound is not substantially reduced as they constitute in effect successive similar groups. Such arrangements have been enlarged by using other arrangements of similar successive groups of traction elements as A—B—C—B—A—B—C—B etc., or A—A—B—B—C—C—B—B—A—A—C—C etc. However, all such similar successive groups are repeated so that the noises produced recur regularly or periodically with resulting rythmical pitch characteristics, either directly from the vibrations or from beats due to wave interference. Accordingly, such successive similar groupings are only slightly effective in the diminution of noises.

The foregoing statment is readily understood when certain mathematical values are considered. A 6.25—16 tire driven at the rate of 30 miles per hour causes the frequency of impulses of the group impacts to increase to a point where a sound of definite pitch is produced. Such a tire has a circumference of approximately 7', and at 30 miles per hour the tire moves horizontally at 44' per second or 6.66 revolutions per second. If eight similar successive groups of traction elements are disposed in the tread, the groups are impacted with ground at the rate of 53 groups per second. Each traction element or block produces a separate noise impulse during each rotation of the wheel, and each group of traction elements likewise produces combined impulses.

If the number of these impulses per second is increased, the secondary impressions disappear and a continuous note is heard when the impulses reach about 30 per second. As the frequency of the impulses is increased beyond this number the pitch of the noise is raised. Accordingly, such a tread arrangement not only produces a high-frequency tone raised by the individual traction elements, but also produces a low-frequency tone by reason of the group impulses which exceed 30 per second at 30 miles per hour.

We propose to eliminate such low frequency tones by eliminating the use of similar successive groups of traction elements, each similar successive group having a plurality of separate traction elements of varying proportions. We propose an arrangement of traction elements in which non-uniform groups of traction elements of a given size are interposed with non-uniform groups of traction elements of another size so as not to produce similar successive groups of traction elements with their resultant periodical noises. This arrangement divides the circumference of the tire into arcs, each arc having tread elements of a uniform size but of a different size from those of adjacent groups, and the angles subtended by the several arcs varying around the circumference of the tire.

With this construction the traction elements of one group produce a series of sound impulses of similar characteristics but their number is so small that they do not produce a pitch sound. The second group produces dissimilar sound producing vibrations, while the subsequent groups of similar proportions vary in number of impulses so as to avoid a uniform repetition of sound.

Figure 2:
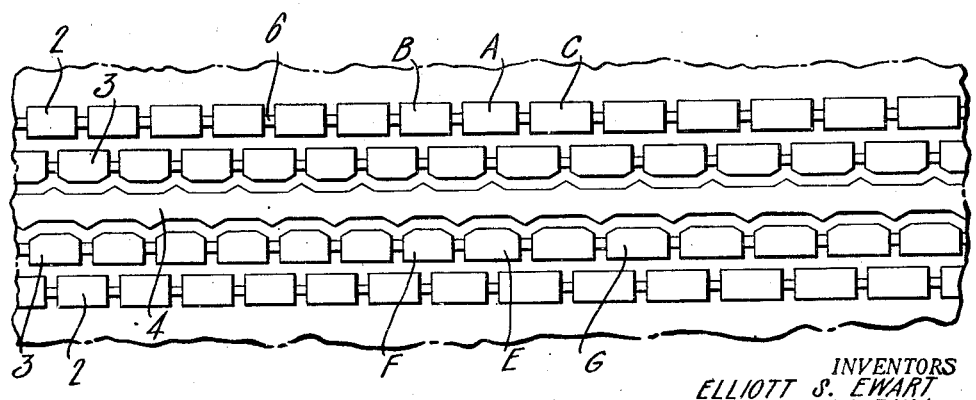

The accompanying drawing illustrates a present preferred embodiment of our invention in which:

Fig. 1 is a side view of a tire showing a preferred embodiment of the invention; and Fig. 2 is a plan view of a portion of the tire tread.

Referring to the drawing, a tire tread embodying our invention is illustrated as having 56 traction elements or blocks A, B, C, disposed circumferentially of the tire. The arrangement illustrated in the direction of the count from the starting point of Fig. 1 is A—6B—A—5C—A—5B—A—6C—A—7B—A—6C—A—6B—A—7C. The single blocks or elements A are of a size intermediate between the blocks B and C so as to provide a graduation in appearance between the groups of B and C elements.

As shown in Fig. 2, the blocks may be disposed in parallel series 2 and 3 of different shapes. A central rib 4 may be disposed between the series. Preferably the blocks in the rows 2 and 3 are staggered with respect to each other by substantially half a block or pitch length.

Numerical values for the blocks A, B, and C, in the No. 2 rows of a 6.25—16 pneumatic tire are A=1.340"; B=1.206"; and C=1.473". In the No. 3 rows, the circumferential lengths may be varied as by using lengths E=1.366"; F=1.299"; G=1.503"; in the sequence E—6F—E—5G—E—5F—E—6G—E—7F—E—6G—E—6F—E—7G. The individual elements or blocks of the inner series No. 3 usually are made slightly longer than those of the outer series 2 because of the greater circumference of the tire near its center. These series are preferably connected by short rubber necks 6.

Referring to Fig. 1, the approximate arcs occupied by each of the groups, and allowing approximately 7° for each of the intermediate blocks A, beginning from the starting point are:

|  | Degrees |
|---|---|
| 6B | 36 |
| 5C | 34 |
| 5B | 28 |
| 6C | 41 |
| 7B | 40 |
| 6C | 41 |
| 6B | 36 |
| 7C | 48 |

It is to be understood that the foregoing values and the specific groupings shown in the drawing are illustrative of only one specific form of the invention and that many other forms, proportions and arrangements of tread elements and/or blocks may be used within the spirit of the invention.

With the illustrated construction, a tire driven at an operating rate of 30 miles per hour completes the tire cycle 6.66 times per second. Under these conditions no group of tread elements, as shown in Fig. 1, can produce more than 13.32 group impulses per second. As it requires at least 30 impulses per second to produce a continuous note, the group arrangement of the present invention eliminates the low frequency tone raised by sound vibrations from traction elements arranged in similar successive groups.

The periodicity of uniform group impulses having been broken up, the next consideration is the characteristics of the noise producing vibrations raised by series of similar individual or a series of dissimilar individual traction elements. Sounds which have the same loudness and dominant pitch may differ in the complexity of the vibrations, and may, therefore, produce a very different effect on the ear. As applied to a tire tread embodying the present invention, each individual traction element or block is capable of producing vibrations varying in degree and in accordance with the relative proportions of the traction element. However, such vibration of a single traction element is of short duration and does not reach the stage of a pure tone until repeated for a length of time exceeding the minimum required by the ear for tone perception. In the illustrated embodiment of our invention as many as seven equally spaced and proportioned blocks may be arranged in a single group, although the seven groups are interposed with other groupings. Such a group develops similar impulses of frequency capable of producing sound of definite pitch. However, the duration of the total group impulse is so short that the pitch raised is incapable of registration by a human ear. At 30 miles per hour a 7C group produces noise for about .022 second, whereas the minimum time for tone perception is about three times this period.

While the traction elements could be designed or apportioned so that the successive elements each would be of different proportions and thereby eliminate entirely equal frequencies of impulses, there are practical reasons which justify the repetition of traction elements of similar proportions. Such tread elements should be held within definite circumferential lengths in order to retain their traction characteristics. Also there are advantages in machine operations in the manufacture of the molds in duplicating at least certain of the traction elements. Furthermore, as a matter of appearance, tread configurations of conventional designs should retain substantial uniformity. For this reason the intermediate blocks A are used.

Accordingly, we have provided a tire tread which diminishes audible noises of definite pitch to a degree not hitherto attained. Our circumferential arc arrangement of traction elements dispels fundamental vibrations and results in sound impulses being broken into a complexity of vibratory noises. The absence of a definite pitch permits the noise developing vibrations to neutralize or otherwise intermingle with each other so that a diminution of noise is effected. The ultimate result effected by our arrangement of tread elements is the production of subdued sound not displeasing in quality.

While we have shown and described a present preferred embodiment of the invention, it is to be understood that the invention may be otherwise embodied within the spirit of the invention and the scope of the appended claims.

Having thus described our invention, what we claim and desire to protect by Letters Patent is:

1. A tire having a tire tread comprising a plurality of groups of tread elements arranged circumferentially of the tire, the tread elements in each group being of the same size and shape circumferentially of the tire but of a different size than those in adjacent groups and the number of elements of a given size varying between some of the groups thereof, whereby the circumference of the tire is divided into arcs of non-uniform lengths and aperiodicity is obtained in the sound resulting from engagement between the tread elements and a surface over which the tire travels.

2. A pneumatic tire having a tire tread comprising a plurality of parallel series of groups of tread blocks arranged circumferentially of the tire, the tread blocks in each group being of the same size and shape circumferentially of the tire but of a different size than those in adjacent groups and the number of blocks of a given size varying between some of the groups thereof, whereby the circumference of the tire is divided into arcs of non-uniform lengths and aperiodicity is obtained in the sound resulting from engagement between the tread blocks and a surface over which the tire travels.

3. A pneumatic tire having a tire tread comprising a plurality of groups of substantially rectangular tread blocks arranged circumferentially of the tire, the tread blocks in each group being of the same size and shape circumferentially of the tire but of a different size than those in adjacent groups and the number of blocks of a given size varying between some of the groups thereof, whereby the circumference of the tire is divided into arcs of non-uniform lengths and aperiodicity is obtained in the sound resulting from engagement between the tread blocks and a surface over which the tire travels.

4. A tire having a tire tread comprising a plurality of groups of tread elements arranged circumferentially of the tire, the sizes of the elements in some of the groups being different from the sizes of the elements in another group and the circumferential lengths of some of the groups being different from the lengths of some of the other groups whereby aperiodicity of sound is produced during movement of the tire.

5. A pneumatic tire having a tire tread comprising a plurality of groups of tread blocks arranged circumferentially of the tire, the tread blocks in each group being of the same size and shape circumferentially of the tire but of a different size than those in adjacent groups and the number of blocks of a given size varying between some of the groups thereof, whereby the circumference of the tire is divided into arcs of non-uniform lengths and aperiodicity is obtained in the sound resulting from engagement between the tread blocks and a surface over which the tire travels, and a transition block of an intermediate size disposed circumferentially between adjacent groups whereby a gradual transition in appearance between the several groups of blocks is produced.

6. A pneumatic tire having a tire tread comprising eight groups of tread blocks arranged circumferentially of the tire, the tread blocks in each group being of the same size and shape circumferentially of the tire but of a different size than those of adjacent groups, the number of blocks in adjacent groups of a given size varying between some of the groups thereof, and a transition block of an intermediate size disposed circumferentially between each pair of groups, whereby the groups subtend angles at the centre of the tire varying from approximately 28° to 41° and aperiodicity in the sound produced by the tire is secured.

7. A pneumatic tire having a tire tread comprising parallel series of eight groups of tread blocks arranged circumferentially of the tire, the tread blocks in each group being of the same size and shape circumferentially of the tire but of a different size than those of adjacent groups, the number of blocks in adjacent groups of a given size varying between some of the groups thereof, and a transition block of an intermediate size disposed circumferentially between each pair of groups, whereby the groups subtend angles at the centre of the tire varying from approximately 28° to 41° and aperiodicity in the sound produced by the tire is secured.

8. A pneumatic tire having a tire tread comprising eight groups of substantially rectangular tread blocks arranged circumferentially of the tire, the tread blocks in each group being of the same size and shape circumferentially of the tire but of a different size than those of adjacent groups, the number of blocks in adjacent groups of a given size varying between some of the groups thereof, and a transition block of an intermediate size disposed circumferentially between each pair of groups, whereby the groups subtend angles at the centre of the tire varying from approximately 28° to 41° and aperiodicity in the sound produced by the tire is secured.

ELLIOTT S. EWART.
ARTHUR W. BULL.